(12) United States Patent
Davison, III et al.

(10) Patent No.: US 7,786,883 B1
(45) Date of Patent: Aug. 31, 2010

(54) RV LEVEL INDICATOR

(75) Inventors: George M. Davison, III, Pittsburgh, PA (US); Peter A. Meier, Pittsburgh, PA (US); Jason R. Rogge, Belle Vernon, PA (US); Louis J. Cremonese, Monroeville, PA (US)

(73) Assignee: CIPA USA, Port Huron, MI (US)

( * ) Notice: Subject to any disclaimer, the term of this patent is extended or adjusted under 35 U.S.C. 154(b) by 305 days.

(21) Appl. No.: 12/005,199

(22) Filed: Dec. 26, 2007

(51) Int. Cl.
   *G08B 21/00* (2006.01)
   *G01C 15/10* (2006.01)

(52) U.S. Cl. .................... 340/686.1; 340/689; 340/440; 33/366.11; 701/124

(58) Field of Classification Search .............. 340/686.1, 340/689, 440; 33/366.11
See application file for complete search history.

(56) References Cited

U.S. PATENT DOCUMENTS

| | | |
|---|---|---|
| 2,155,876 A | 4/1939 | Stout |
| 3,181,203 A | 5/1965 | Wenger |
| 3,258,884 A | 7/1966 | Wenger |
| 3,260,564 A | 7/1966 | Woelfel |
| 3,417,518 A | 12/1968 | Jaffe |
| 3,866,365 A | 2/1975 | Honigman |
| 4,232,488 A | 11/1980 | Hanley |
| 4,568,096 A | 2/1986 | Yew et al. |
| 4,572,527 A | 2/1986 | Stafford-Mills et al. |
| 4,743,037 A | 5/1988 | Hanser |
| 4,746,133 A | 5/1988 | Hanser et al. |
| 4,784,400 A | 11/1988 | Hofius |
| 5,078,442 A | 1/1992 | Rau et al. |
| 5,136,784 A | 8/1992 | Marantz |
| 5,159,989 A | 11/1992 | Claxton |
| 5,176,391 A | 1/1993 | Schneider et al. |
| 5,188,379 A | 2/1993 | Kraus et al. |
| 5,676,385 A | 10/1997 | Schneider et al. |
| 5,806,196 A | 9/1998 | Gibbs et al. |
| 6,176,495 B1 | 1/2001 | Decker |
| 6,526,668 B1 * | 3/2003 | Beckhart et al. .......... 33/366.11 |
| 7,025,361 B1 * | 4/2006 | Erickson ................... 280/6.153 |
| 2006/0100979 A1 * | 5/2006 | Venturino et al. ............... 707/1 |
| 2007/0180719 A1 * | 8/2007 | Donnelly et al. .......... 33/366.11 |
| 2007/0245579 A1 * | 10/2007 | Decker ..................... 33/366.11 |
| 2008/0142768 A1 * | 6/2008 | Thorpe et al. ................ 254/423 |

* cited by examiner

*Primary Examiner*—Benjamin C Lee
*Assistant Examiner*—Andrew Bee
(74) *Attorney, Agent, or Firm*—Young Basile Hanlon & MacFarlane, PC

(57) ABSTRACT

An electronic level indicator for facilitating the leveling of RV's including battery-powered base and handheld mobile units with an RF link between them. A sensor in the base generates a coded signal transmitted to the mobile unit which activates LED's in a pattern showing low corners of the RV.

8 Claims, 5 Drawing Sheets

RV LEVEL INDICATOR

FIELD OF THE INVENTION

This invention relates to level indicators and particularly to a device which is useful in the process of leveling, for example, a recreational vehicle (RV).

BACKGROUND OF THE INVENTION

Recreational vehicles such as trailers and motor homes are typically provided with corner jacks which allow the operator to level the floor of the vehicle on various non-level ground conditions. The corner jacks may be manually or hydraulically operated. Typically there are three jacks for a smaller towed vehicle and four for a larger towed vehicle and for a motor home. It is usually deemed necessary to level the RV in order for onboard water systems and refrigeration devices to operate correctly.

It is known to place a level indicating device such as a "bubble level" in the RV, on the floor or on a table top and to derive information from the device as to the particular orientation of the RV. Similarly, level indicators can be mounted on the side and rear surfaces of the RV where they can be viewed by the operator in the course of manipulating the jacks to level the RV. Both of these approaches require the operator to move back and forth between the jacks and the level indicator(s) as the leveling process moves forward.

SUMMARY OF THE INVENTION

The present invention solves the problems of the prior art by providing a portable electronic device made up of two preferably battery powered units: a base unit adapted to be placed on a surface such as the floor or table top of an RV, and a handheld mobile unit with indicator lights activated in accordance with information provided by the base unit. In the preferred embodiment, the base provides a cradle for the handheld mobile unit so the two units can be stored together when not in use.

A radio link is provided between the base and handheld mobile units to transmit information from the base unit to the handheld mobile unit; specifically, the base unit includes a sensor/encoder/transmitter and the handheld mobile unit includes a receiver/decoder/indicator. This allows the operator to place the base unit on a floor or tabletop in the RV and walk to the jacks with the handheld mobile unit in his or her hand, thus eliminating the back and forth trips between the jacks and the base unit during the leveling process.

In the preferred embodiment, the base unit is provided with a sensor in the form of a two axis accelerometer and an initial alignment indicator which may, for example, be shaped like an arrowhead so that the base unit may be correctly and properly aligned relative to the longitudinal axis of the RV before the leveling process begins. The alignment indicator may be lighted so that the device can be used in a variety of lighting conditions, and may also serve as a toggle switch to turn the base unit on and off.

Also in the preferred embodiment, the level condition indicators on the handheld mobile unit are LED's arranged in a pattern representing the corners of the RV where jacks are located. The illustrated example uses a quadrature pattern because the RV has four corners, all equipped with jacks. There are two lights in each corner, one red and one green. Exciting the green light indicates a level condition; exciting the red light indicates a low condition and exciting neither light indicates a high condition. Either of the red and green lights can be caused to flash if desired. These colors and the condition associations are given purely by way of example as other arrangements and color schemes or even monochromatic lights can be used.

The references to use of the inventive device in leveling an RV are exemplary only since the device may also be used to level various other articles such as pool tables, gymnastic equipment and so forth.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENT

Figure 1:
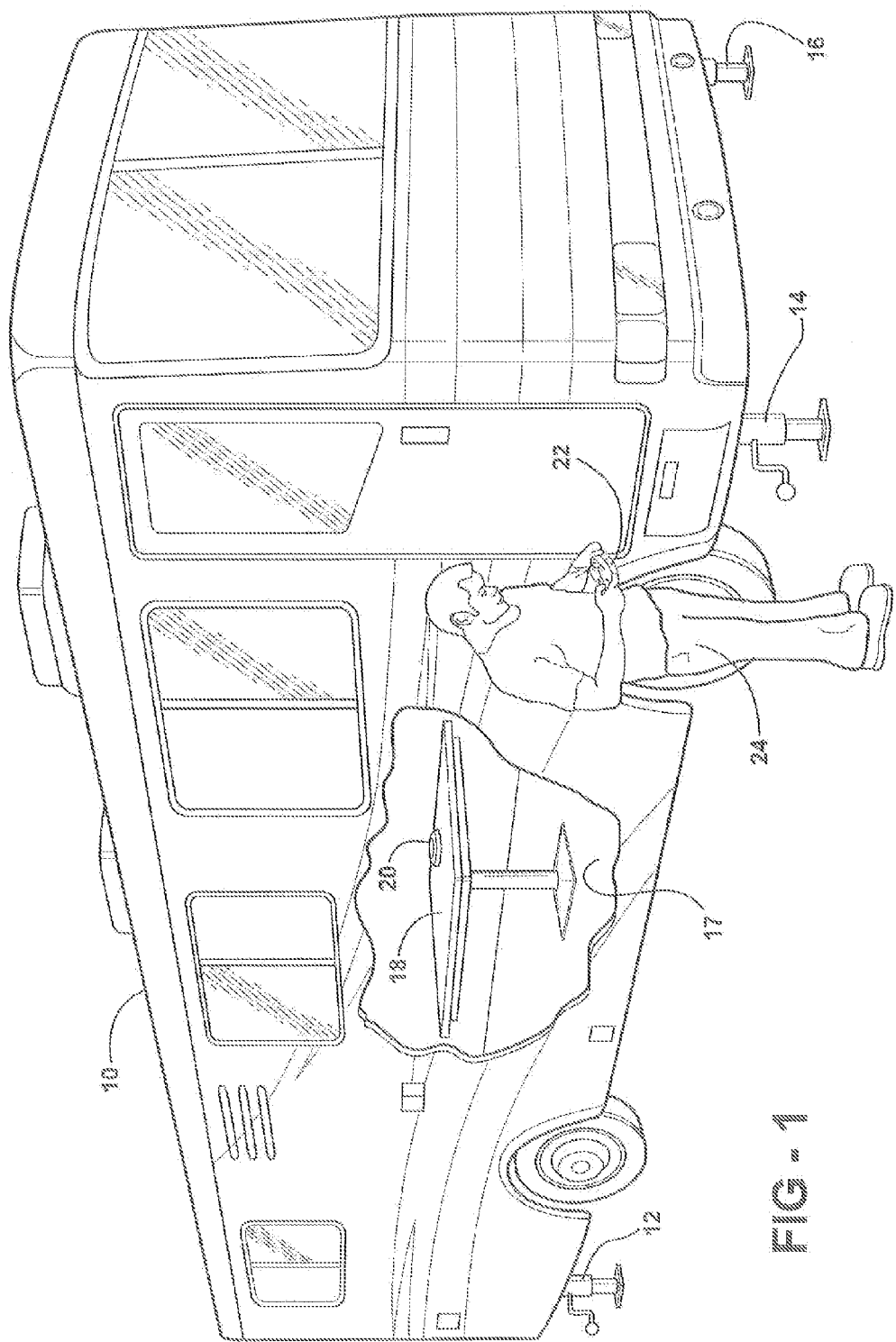
FIG. 1 is a perspective view of a motor home with four corner jacks and an interior table and demonstrates the industrial utility of the present invention.

FIG. 1 shows a recreational vehicle (RV) in the form of a motor home 10 having manually operated corner jacks 12, 14 and 16 which can be used to level a motor home on non-level ground. Although only three jacks are shown, it is to be understood that the rectangular motor home has four corner jacks, one in each corner of the vehicle. In addition, the motor home 10 is provided with a floor 17 and a floor-mounted interior table 18 the surface of which is essentially parallel to the floor of the motor home 10 and, therefore, is level when the motor home is level.

In FIG. 1, a level condition indicating device as shown in use. The device comprises a base unit 20 which is resting on the top of the interior table 18 in a particular orientation hereinafter described. The device further comprises a handheld mobile unit 22 which is in the hands of an operator 24 who is in the process of leveling the motor home 10 by means of the manual corner jacks 12, 14, 16.

Figure 2:
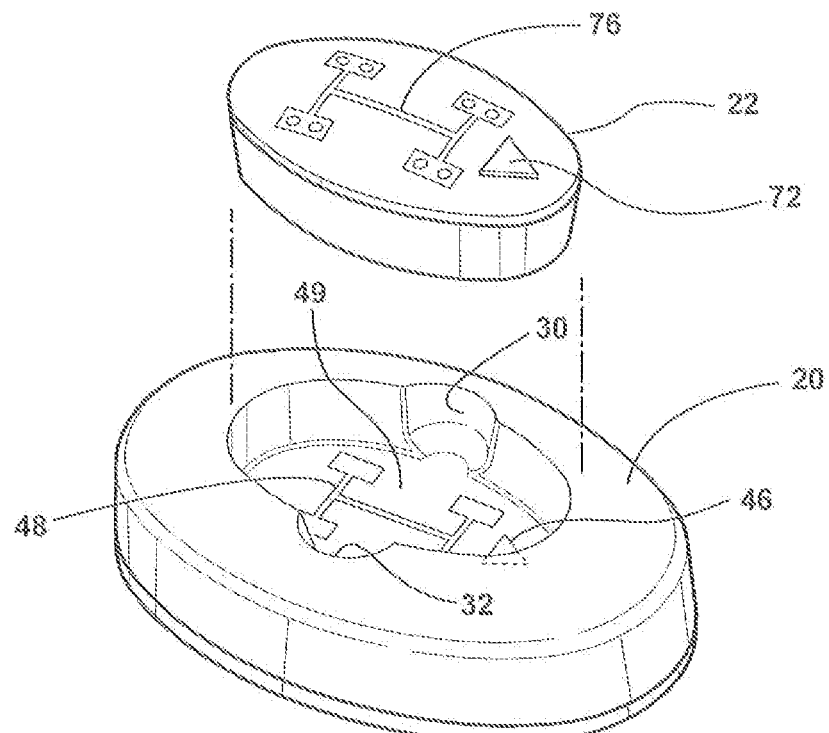
FIG. 2 is a perspective view of illustrative examples of base and handheld mobile units with the mobile unit lifted out of the base cradle.
Figure 3:
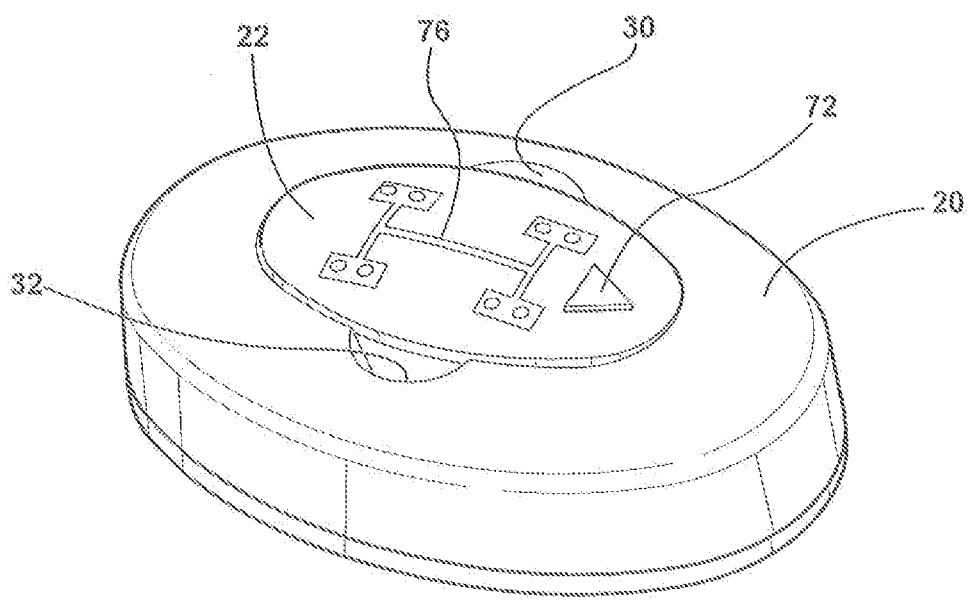
FIG. 3 shows the units of FIG. 2 with the mobile unit in the base cradle.
Figure 4:
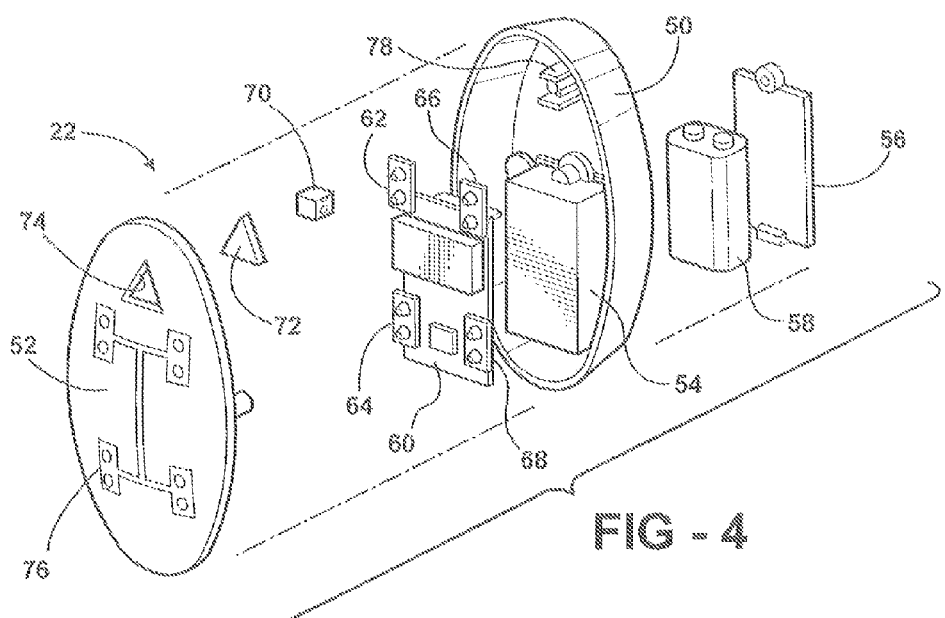
FIG. 4 is an exploded view of the mobile unit showing its components.
Figure 5:
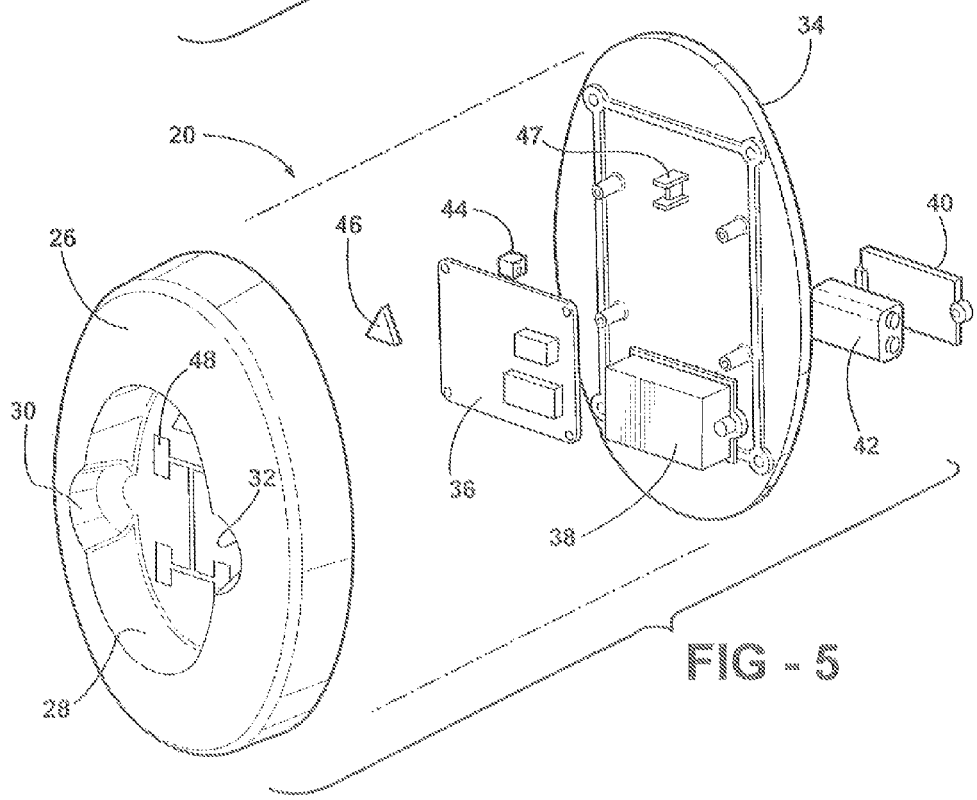
FIG. 5 is an exploded view of the base unit showing its components.

Referring now to FIGS. 2-5, the level condition indicating device comprising the base unit 20 and the handheld mobile unit 22 will be described in greater detail. As shown in FIGS. 2, 3 and 5, the base unit 20 comprises an oval shaped plastic housing 26 having a top opening oval shaped cavity 28 with semi-cylindrical side pockets 30 and 32 which provide finger clearance so the operation can easily remove the unit 22 from the base 20. The height of the housing 26 and the size of the top opening cavity 28 is such as to provide a cradle to receive a handheld mobile unit 22 as shown in FIG. 3 for storage purposes. The base unit 20 and the mobile unit 22 are provided with matching patterns 48 and 76 together with arrowheads 46, 72 to show how to align the two units with one another as well as with the longitudinal axis of the motorhome 10 when leveling is in process.

Referring further to FIG. 5, the base unit 20 comprises an oval shaped plastic bottom 34 carrying a circuit board 36, a battery housing 38, a battery access door 40, and a 9 volt DC battery 42. A push-to-toggle type off/on switch is mounted on the button 34 by way of contacts 47 and is operated by an arrowhead shaped push button 46 which is flush with the bottom 49 of the base unit 20 when assembled. The arrowhead shaped push button 46 not only turns the unit on and off but also indicates the proper orientation of the base unit 20 relative to the longitudinal axis of the motor home 10 when the level condition indicator device is being used in the process of leveling the motor home. Typically the base unit 20 is placed on the table so that the arrowhead shaped push button 46 points directly toward the front of the motor home 10.

The base unit 20 is provided with mechanical details shown in the drawing and the utility of which in assembling and fastening the components of the base unit together will be apparent to persons skilled in the mechanical arts.

The floor of the base unit is also preferably provided with a pattern 48 representing the quadrature arrangement of the four wheels and jacks of the motor home 10.

Referring now primarily to FIG. 4, the handheld unit 22 is shown to comprise an oval shaped plastic housing 50 and a top plate 52 having a quadrature pattern 76 embossed, printed or otherwise formed thereon to coincide with the quadrature pattern 48 on the floor 49 of the base unit 20. A battery compartment 54 receives 9 volt battery 58 and is closed by means of a plastic door 56. All of the plastic components of the base unit 20 in the handheld mobile unit 22 are preferably made of high density polyethelene (HDPE) but other suitable polymeric materials can be used as well.

The circuit board 60 carries four LED cards 62, 64, 66 and 68 with two LED's mounted on each card. The cards are arranged in a quadrature pattern corresponding to the pattern 76 and holes are formed in the top 52 such that the LED's hereinafter described in detail with reference to FIG. 6 show through the top plate 52 so they may be seen by the operator 24.

A toggle type push button switch 70 is mounted on contacts 78 to turn the handheld mobile unit on and off. An arrowhead shaped push button 72 is connected to the switch 70 and is accessible through a triangular opening 74 in the top plate 52 not only to turn the handheld mobile unit on and off but also to correlate the LED's to the physical orientation of the motor home 10; i.e. the arrowhead shaped push button 74 indicates the front of the motor home 10 regardless of the physical orientation of the handheld mobile unit 22. Again, the handheld mobile unit is held together by screws in a conventional fashion.

Figure 6:
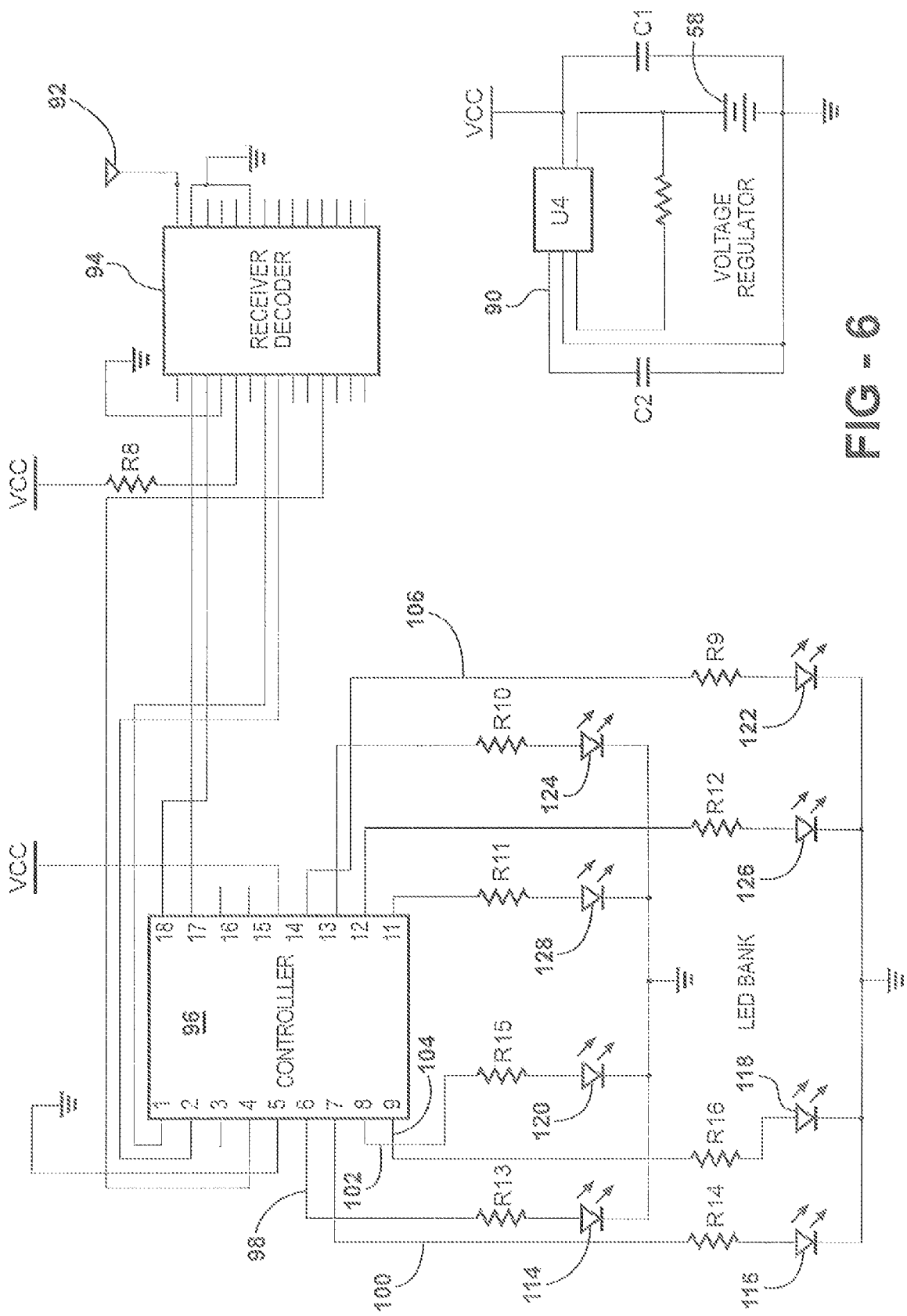
FIG. 6 is a schematic circuit diagram of the mobile unit.
Figure 7:
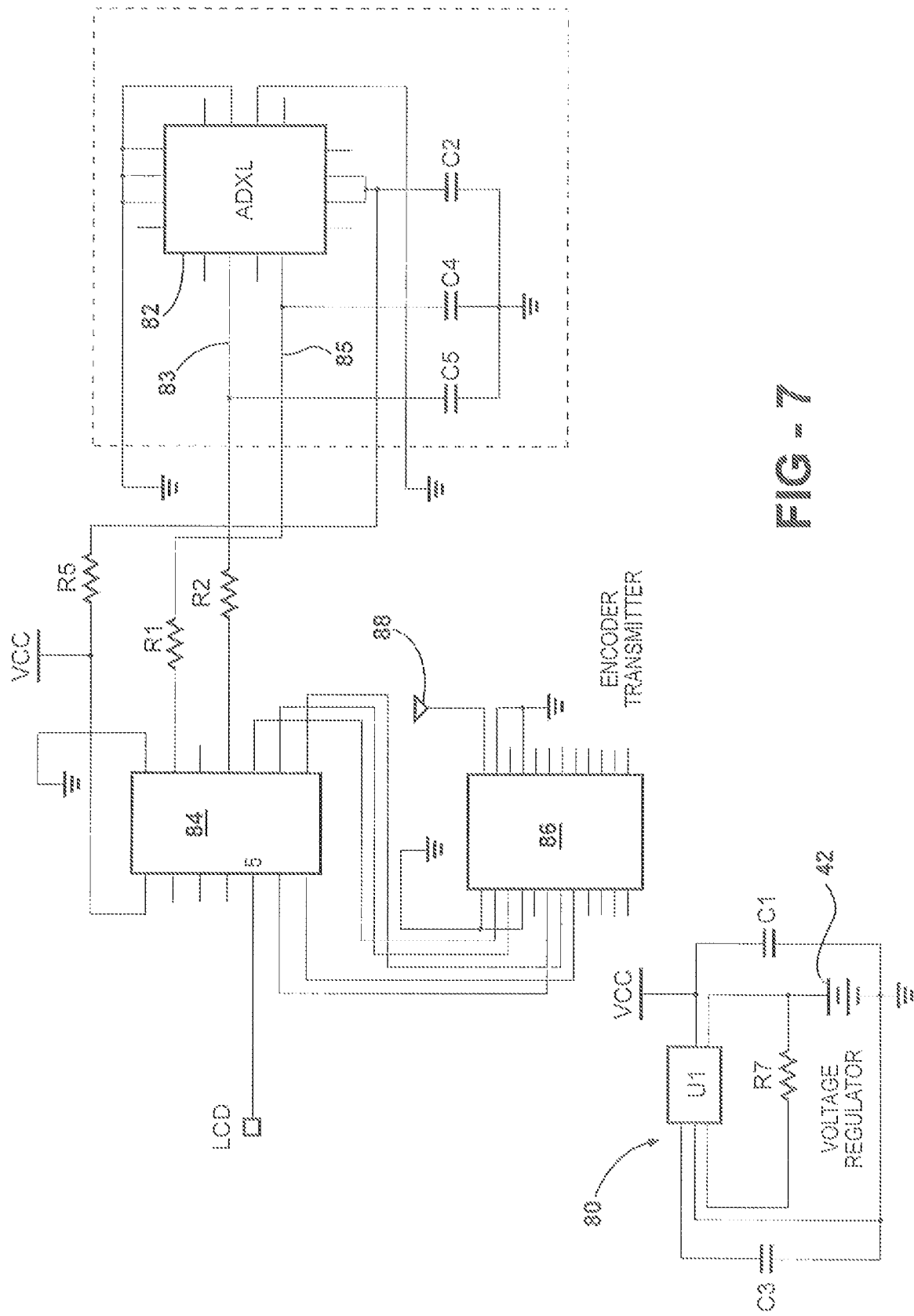
FIG. 7 is a schematic circuit diagram of the base unit.

Turning now to FIGS. 6 and 7, the details of the electronics associated with the base and mobile units will be described in detail. The base unit circuit of FIG. 7 comprises a two axis tilt sensor in the form of an accelerometer 82 such as an Analog Devices Model ADXL 322. The accelerometer 82 is positioned in the base unit so that one axis of sensitivity is aligned with the arrowhead bottom 46 and, therefore, with the longitudinal axis of the motor home 10 when the base unit is purposely placed on the top of the table 18 with the arrowhead shaped indicator 46 pointing toward the front of the motor home. The other axis of sensitivity for the accelerometer 82 is a "pitch" axis at 90° to the first axis; i.e., the two axes are effectively "pitch" and "roll" sensor axes.

The outputs of the accelerometer 82 are in the form of a pair of DC voltages which assume a reference value when the accelerometer is level about the associated axis and either increase or decrease relative to the reference voltage when the accelerometer is tilted; i.e., non-level about the particular axis of sensitivity. The outputs appear on lines 83 and 85.

The two DC voltages on lines 83 and 85 are applied to pins 11 and 13 of a microprocessor 84 such as a PIC 16F 684 14-pin flash-based 8 bit CMOS Microcontroller containing an internal analog to digital converter which compares the DC voltage inputs to a reference voltage provided by a voltage regulator 80 and generates a 10 bit binary code which is either higher or lower in numerical value than a set reference binary number. These binary numbers, one for each axis, are applied to an RF encoder/transmitter 86 which is connected to an RF antenna 88 to transmit a signal to the handheld mobile unit 22 as hereinafter described. The transmitter operates on a frequency of 315 Mhz AM and may be a TXE-315-KHZ Transmitter/Encoder module available from Linx Technologies. The antenna 88 is a model ADF-315-SP from Antennat Factors. The microchip UI in the voltage regulator is a PQ1M505M2SPQ available from Sharp Electronics. The LCD shown connected to pin 5 of the microprocessor 84 is for calibration purposes only and is not present when the device is in use.

Referring now to FIG. 6, the electronics of the handheld mobile unit are shown to comprise a receiver decoder 94 which may be a RXD-315-KH2 also from Linx. An antenna 92 identical to antenna 88 is connected to one input to of receiver/decoder 94 to receive the transmitted signal from the base unit as described above. A voltage regulator 90 having a Sharp microchip regulator U4 that operates in conjunction with the 9 volt battery 58 to provide a regulated DC voltage to the receiver decoder 94 as well as to the microprocessor 96 which analyzes the data and determines which, if any, of the LED's visible on the face of the handheld mobile unit are to be lighted. The microprocessor 96 is a PIC16F648A with 18 pins from Microchip and has output lines 98, 100, 102, 104, 106, 108, 110 and 112 connected to respective LED's 114, 116, 118, 120, 122, 124, 126 and 128 respectively. The LEDs are arranged so that one red LED and one green LED appear in the corner of the quadrature pattern on the top plate 52 of the handheld mobile unit. Specifically, LED's 114, 120, 128 and 124 are green; LED's 116, 118, 126 and 122 are red. The receiver operates at the same 315 Mhz AM frequency of the transmitter. The convention used with this device is: a lighted green LED indicates leveled; a lighted red LED indicates a low condition and no LED lighted indicates a high condition. These are given by way of example and other protocols may be used.

INDUSTRIAL APPLICABILITY

In use, the operator places the base unit 20 on the table 18 with the arrowhead shaped push button pointing toward the front of the vehicle. He removes the handheld mobile unit 22 from the base unit 20 and pushes the push button 44 in the base unit to turn the unit on. The operator similarly pushes the pushbutton 70 of the handheld mobile unit to turn that unit on. The operator steps outside of the vehicle to begin the leveling operation by appropriate manipulation of the jacks 12, 14, 16 and the unnumbered jack shown in the hidden corner as necessary to level the motor home 10. If the front of the motor home 10 is high, the accelerometer 82 senses the low condition at the rear of the motor home and lights the two red LEDs at the bottom of the quadrature pattern 76; i.e., the red LEDs farthest from the arrowhead shaped push button 74. The operator then operates the rear jacks to raise the rear of the motor home until the two lighted red LEDs go out and the corresponding green LEDs immediately adjacent the previously lighted red LEDs come on. At that point the vehicle is level and four green lights should appear in the quadrature pattern 76. The operator 10 then turns the handheld unit off and returns it to the base after turning the base unit off as well.

A fully functional device which has been found to be satisfactory for the purposes described herein uses the following values from components shown in FIGS. 6 and 7, in all cases Vcc is 5 volts:

| Base Unit Resistors | Capacitors |
|---|---|
| R1 5.2 KΩ | C1 150 nF |
| R2 5.2 KΩ | C2 100 nF |
| R5 100 Ω | C3 100 nF |
|  | C4 100 nF |
|  | C5 100 nF |
| Mobile Unit Resistors | Mobile Unit Capacitors |
| R5 200 Ω | C1 100 nF |
| R9 470 Ω | C2 100 nF |
| R10 470 Ω |  |
| R11 470 Ω |  |
| R12 470 Ω |  |
| R13 470 Ω |  |
| R14 470 Ω |  |
| R15 470 Ω |  |
| R16 470 Ω |  |

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A device for indicating the level condition of a levelable object having a leveling system, the device comprising:
    a base unit adapted to be placed on a surface associated with the object and including a sensor for producing a signal related to the level condition of said object relative to at least one axis of orientation;
    a mobile unit adapted to be hand carried and producing a visual indication of various level conditions; and
    an RF link between the base and mobile units such that the level condition indicated by the mobile unit is the level condition of the base unit relative to said axis;
    said base and mobile units having coordinated orientation indicators thereon to co-orient said units to said axis;
    wherein said orientation indicators are pushbuttons shaped to indicate orientation, and serve to activate toggling for Off/On operation of each unit;
    said base and mobile units being independent of said leveling system.

2. A device as described in claim 1 wherein the base unit includes a receiver conforming to and receiving said mobile unit therein, the physical structure of the receiver being such as to allow orientation of the mobile unit relative to the base unit in which said orientation indicators are co-oriented when the mobile unit is fully and properly received in the receiver of the base unit.

3. A device as described in claim 2 wherein each of the base and mobile units includes a power circuit and a switch for activating and deactivating the power circuit, the switch being activated by the toggling of said orientation indicator.

4. A device as defined in claim 3 wherein each of the units includes an RF transceiver circuit.

5. A device as defined in claim 2 wherein said orientation indicators are in the shape of arrowhead pointers.

6. A device as described in claim 1 wherein the mobile unit carries a quadrature arrangement of LEDs providing said visual indication, at least one LED being placed at each corner of the quadrature arrangement.

7. A battery powered portable device for indicating the level condition of an object such as a recreational vehicle having a leveling system, the device comprising:
    a base unit having a flat bottom surface adapted to be placed on a surface associated with the object being leveled and an upper surface including a receptacle of predetermined shape; said base unit further comprising a two-axis accelerometer for producing a pair of signals related to the level condition of said object relative to two orthogonal axes of orientation;
    a battery powered mobile unit shaped to be removably placed within the receptacle and having a display including a predetermined pattern of LEDs arranged on a surface thereof for producing a visual indication of various level orientations of the base unit;
    each of said base and mobile units having battery powered transceivers whereby signals produced by said sensor are transmitted in RF form to the mobile unit and decoded to activate said display;
    each of said base and mobile units having coordinated orientation indicators such that said units may be co-oriented with one another and with said object;
    wherein said orientation indicators are pushbuttons shaped to indicate orientation, and serve to activate toggling for Off/On operation of each unit;
    said base and mobile units being independent of said leveling system.

8. A device as defined in claim 7 wherein the orientation indicators are arrowhead pointer-shaped and are toggle pushbuttons.

* * * * *